US012607980B2

(12) United States Patent
Gutknecht et al.

(10) Patent No.: US 12,607,980 B2
(45) Date of Patent: Apr. 21, 2026

(54) MANUFACTURING ASSISTANCE SYSTEM FOR AN ADDITIVE MANUFACTURING SYSTEM

(71) Applicant: United Grinding Group Management AG, Bern (CH)

(72) Inventors: Kai Gutknecht, Uznach (CH); Pascal Brunner, Hosenruck (CH)

(73) Assignee: United Grinding Group Management AG, Bern (CH)

(*) Notice: Subject to any disclaimer, the term of this patent is extended or adjusted under 35 U.S.C. 154(b) by 651 days.

(21) Appl. No.: 18/097,061

(22) Filed: Jan. 13, 2023

(65) Prior Publication Data

US 2023/0359170 A1 Nov. 9, 2023

(30) Foreign Application Priority Data

May 6, 2022 (EP) .................................... 22172067

(51) Int. Cl.
    *G05B 19/4099* (2006.01)
(52) U.S. Cl.
    CPC .................... *G05B 19/4099* (2013.01); *G05B 2219/49023* (2013.01)
(58) Field of Classification Search
    CPC ...... G05B 19/4099; G05B 2219/49023; B22F 2999/00; B22F 10/28; B22F 10/80;
    (Continued)

(56) References Cited

U.S. PATENT DOCUMENTS

2017/0203512 A1* 7/2017 Gold ........................ B22F 12/90
2019/0039319 A1* 2/2019 Bechmann .............. B22F 10/32
(Continued)

FOREIGN PATENT DOCUMENTS

EA 3 388 907 A1 10/2018
EP 3192598 A1 * 7/2017 ......... B23K 15/0086
(Continued)

OTHER PUBLICATIONS

Extended European Search Report Application No. 22172067.5, dated Oct. 7, 2022.
(Continued)

*Primary Examiner* — Kamini S Shah
*Assistant Examiner* — Michael Tang
(74) *Attorney, Agent, or Firm* — MARSHALL, GERSTEIN & BORUN LLP

(57) ABSTRACT

The present invention relates to a manufacturing assistance system for an additive manufacturing system, an additive manufacturing system comprising such manufacturing assistance system, a method for operating such manufacturing assistance system and a computer program element for such manufacturing assistance system. The manufacturing assistance system comprises a process sensor unit, an imaging sensor unit and a control unit. The process sensor unit is arrangeable at the additive manufacturing system and configured to generate process data during manufacturing an object by the additive manufacturing system. The imaging sensor unit is arrangeable at the additive manufacturing system and configured to generate image data of the object during manufacturing. The control unit is configured to collect the process data generated by the process sensor unit and the image data generated by the imaging sensor unit and to correlate the process data and the image data to determine a current state of the object.

18 Claims, 2 Drawing Sheets

(58) Field of Classification Search
CPC .......... B22F 10/85; B22F 12/90; B22F 12/00;
B29C 64/393; B29C 64/20; B33Y 30/00;
B33Y 50/02
USPC ........................................................ 700/118
See application file for complete search history.

(56) References Cited

U.S. PATENT DOCUMENTS

| | | | |
|---|---|---|---|
| 2020/0139625 A1* | 5/2020 | Allanic | ................. B33Y 40/00 |
| 2020/0147868 A1 | 5/2020 | Gold | |
| 2021/0016509 A1* | 1/2021 | Vora | ...................... B29C 64/393 |
| 2022/0066426 A1 | 3/2022 | Czinger et al. | |
| 2022/0193990 A1* | 6/2022 | Haley | ....................... G06T 7/74 |
| 2023/0166452 A1* | 6/2023 | Decrop | ................ B29C 64/386 |
| | | | 700/100 |

FOREIGN PATENT DOCUMENTS

| | | | | |
|---|---|---|---|---|
| EP | 3388907 A1 * | 10/2018 | ........... | B29C 64/393 |
| EP | 3538295 B1 * | 5/2023 | .............. | B22F 10/31 |
| WO | WO-2017197449 A1 * | 11/2017 | ......... | G05B 23/0235 |
| WO | WO-2018/217903 A1 | 11/2018 | | |
| WO | WO-2019125970 A1 * | 6/2019 | ............. | G06N 20/00 |

OTHER PUBLICATIONS

Communication pursuant to Article 94(3) EPC for European Application No. 22172067.5, dated Nov. 28, 2023.

* cited by examiner

MANUFACTURING ASSISTANCE SYSTEM FOR AN ADDITIVE MANUFACTURING SYSTEM

CROSS-REFERENCE TO RELATED APPLICATIONS

The present application claims priority to European Application No. 22172067.5, filed May 6, 2022, which is hereby incorporated by reference in its entirety.

TECHNICAL FIELD

The present invention relates to a manufacturing assistance system for an additive manufacturing system, an additive manufacturing system comprising such manufacturing assistance system, a method for operating such manufacturing assistance system and a computer program element for such manufacturing assistance system.

BACKGROUND ART

Additive manufacturing, e.g., selective laser melting, can be understood in that a thin layer of metal powder is spread onto a substrate and fused or hardened by a laser beam. The laser beam effects a melting and welding of the metal powder particles to form a quasi-solid metal. This process can be repeated layer by layer until a product is complete.

Generally, an additive manufacturing apparatus comprises one or more monitoring devices adapted to monitor and control the process steps to improve productivity and quality of the manufactured product. For instance, in an additive manufacturing process, both a power intensity and a focus position of a laser during the process are decisive for the quality of the manufactured product. A focus shift during the process is primarily caused by temperature changes in the optics or in the laser. The focus position and beam power should therefore be kept constant during the manufacturing process by controlling and regulating the optics and the laser.

However, beyond the intensity and focus position of the laser, many process factors may also affect process results. Thus, to ensure a desired product quality, such influences shall be directly adjusted during manufacturing, which enables a reliable automated manufacturing process. Accordingly, the monitoring system of the additive manufacturing apparatus needs to be further improved.

SUMMARY

Hence, there may be a need to provide an improved manufacturing assistance system for an additive manufacturing system, which may monitor factors affecting an additive manufacturing process and adjust one or more factors during the additive manufacturing process.

The problem is solved by the subject matter of the independent claims of the present invention, wherein further embodiments are incorporated in the dependent claims. It should be noted that the aspects of the disclosure described in the following apply to the manufacturing assistance system for an additive manufacturing system, the additive manufacturing system comprising such manufacturing assistance system, the method for operating such manufacturing assistance system and the computer program element for such manufacturing assistance system.

According to the present invention, a manufacturing assistance system for an additive manufacturing system is presented. The manufacturing assistance system comprises a process sensor unit, an imaging sensor unit and a control unit. The process sensor unit is arrangeable at the additive manufacturing system and configured to generate process data during manufacturing an object by the additive manufacturing system. The imaging sensor unit is arrangeable at the additive manufacturing system and configured to generate image data of the object during manufacturing. The control unit is configured to collect the process data generated by the process sensor unit and the image data generated by the imaging sensor unit and to correlate the process data and the image data to determine a current state of the object.

The manufacturing assistance system according to the present invention may allow an online quality control of the additive manufacturing process. By ensuring a real time monitoring and controlling the additive manufacturing system by the manufacturing assistance system, productivity and/or quality of the manufactured object may be improved. Further, a fully automated additive manufacturing can be realized.

The manufacturing assistance system may be adapted to monitor the additive manufacturing systems such as Selective Laser Melting system (SLM) or Laser Powder Bed Fusion system (LPBF). During an additive manufacturing process, fine metal powder can be evenly distributed onto a substrate to form a thin layer by means of a doctor blade. This may take place inside a manufacturing chamber containing a tightly controlled atmosphere with inert gas and very low oxygen levels. Once the layer has been distributed, the 2D layer or slice of the product may be fused or welded by selectively melting the powder. This may be accomplished by means of a high-power laser beam. The laser energy shall be configured to permit melting and welding of the fine metal powder particles to form solid metal. This process shall be repeated layer by layer until the product is completely formed.

The manufacturing assistance system may be arranged at least partially inside the additive manufacturing system and coupled with various sensor technologies of the additive manufacturing system for enabling an on-line, in other words real time monitoring during manufacturing.

Among them, the process sensor unit may be configured to monitor inside the manufacturing chamber, in which a workpiece is formed by laser melting the powder material. The process sensor unit may be configured to generate process data, which may be non-image data. The process sensor unit may be arranged to generate process data comprising various parametric data, which may be predefined and/or adjusted. The process data may comprise any position data, speed data, temperature data and/or capacity data. The process data may also comprise stochastic errors of the additive manufacturing process.

The imaging sensor unit may be mounted inside and/or outside the manufacturing chamber and monitor the manufacturing process. The imaging sensor unit may monitor a powder melting bath as well as the entire substrate surface in order to control a powder application quality or a temperature distribution on/above the substrate, etc. The imaging sensor unit may also allow, for example, monitoring a gas flow, particularly a homogeneous and laminar gas flow, inside the manufacturing chamber to ensure that a uniform laser quality can be provided and an oxidation of the powder material, a moisture absorption by the powder material, etc. during a laser scanning can be avoided.

The imaging sensor unit may comprise various optical imaging elements to monitor inside the manufacturing chamber by capturing image(s). The imaging sensor unit may comprise an on-axis sensor element, which may be configured to detect process emissions from a melt pool area. If illumination is present, the on-axis sensor can also detect the powder bed surrounding the heat affected zone. The on-axis sensor may include a ratiometric pyrometer, photodiodes and/or a high speed camera designed to detect the temperature of the powder bath surrounding the workpiece produced by the selective melting.

The control unit may be a main control unit of the additive manufacturing system or a decentralized control unit. The control unit may comprise at least one computing element and a database and it may be configured to perform a computer-implemented method for monitoring and controlling the additive manufacturing process.

Specifically, the control unit may collect the process data generated by the process sensor unit and the image data generated by the imaging sensor unit and store them in the database. Alternatively, each of the process sensor unit and the imaging sensor unit may send the generated process data and image data to the database and the control unit may be able to access the required data in the database. Based on the collected data, the control unit may be capable to determine and analyze a relationship between the process data and the image data by correlating them with each other. The relationship may be represented e.g. graphically and/or in a table. Further, the control unit may be able to synchronize entire process data with each respective coordinate.

Since the process sensor unit and the imaging sensor unit may generate the respective data during the additive manufacturing on-line, in other words, in real time, the control unit is capable to predict the current state of the object being manufactured based on the correlation information of the process data and the image data. Particularly, the control unit may be adapted to compare the current state of the object at a certain layer level with the correlation of the process data and the image data and verify if the object being manufactured meets predefined requirements or has any failure.

Accordingly, the manufacturing state and/or quality of the targeted object may be evaluated at an early stage, which may allow adjusting the manufacturing parameters immediately during the additive manufacturing process, in case the current quality deviates from the desired quality.

In an example, the manufacturing assistance system further comprises a system monitoring unit, wherein the system monitoring unit is configured to provide current machine data to the control unit, wherein the control unit is configured to correlate the process data, the image data and/or the machine data to determine a current state of the object. The machine data may comprise, for instance, machine routine data, power supply/consumption data, material supply/releasing data, operating time, operating information of periphery devices, etc.

The system monitoring unit may be configured to detect the machine data of the additive manufacturing system in real time and the control unit may be able to collect the detected machine data. Additionally or alternatively, the machine data may be stored in the database and the control unit may access required data in the database. Based on the collected data, the control unit may determine and analyze a relationship among the process data, the image data, error data and machine data by correlating them with each other. The relationship may be represented graphically and/or in a table.

Since the system monitoring unit may generate the machine data in real time, the control unit is capable to predict the current state of the object being manufactured based on the correlation information of the process data, the image data, error data and/or machine data. Particularly, the control unit may be adapted to compare the current state of the object at a certain layer level with the correlation of the process data, the image data, error data and/or machine data and verify if the object being manufactured meets predefined requirements or has any failure.

In an example, the manufacturing assistance system further comprises an error detection unit, wherein the error detection unit is configured to generate error data based on a human error during manufacturing the object and send the error data to the control unit, wherein the control unit is configured to correlate the process data, the image data, the machine data and/or the error data to determine a current state of the object.

The error detection unit may be arranged inside and/or outside the manufacturing chamber and detect if there is a human error or interference during the additive manufacturing process. The human interference may be, for instance, opening of the manufacturing chamber or of the additive manufacturing system during the running process, any incorrect control command provided to the manufacturing system, etc., which may be occurred outside the manufacturing chamber or even outside the additive manufacturing system.

Such human error may be detected by the error detection unit coupled to various sub-control elements of the additive manufacturing system. The error detection unit may be adapted to distinguish human errors from machine errors and generate error data of the human errors. Such error data may be collected by the control unit. Additionally or alternatively, the error data may be stored in the database and the control unit may access required data in the database. Based on the collected data, the control unit may be able to determine and analyze a relationship among the process data, the image data and the error data by correlating them with each other. The relationship may be represented graphically and/or in a table.

Since the error detection unit may generate the error data in real time as well, the control unit is capable to predict the current state of the object being manufactured based on the correlation information of the process data, the image data and/or the error data. Particularly, the control unit may be adapted to compare the current state of the object at a certain layer level with the correlation of the process data, the image data and/or the error data and verify if the object being manufactured meets predefined requirements or has any failure.

In an example, the manufacturing assistance system further comprises an image computational unit, wherein the image computational unit is configured to provide CAD data of the object during manufacturing to the control unit. The control unit is configured to correlate the process data, the image data, the error data, the machine data and/or the CAD data to determine a current state of the object.

The image computational unit may be adapted to be implemented in a build processor, which can provide machine-specific image data for supporting the additive manufacturing of the object. The image computational unit may comprise at least one computing element and a computational program. Alternatively, the image computational unit or the computing element may be able to couple with the computational program for generating CAD data. The image computational unit may be capable to load data of a plurality of data sources such as process data, image data, error data, machine data, etc. from the database and generate the image data, which may describe the construction job of the object in a predefined interval.

Additionally or alternatively, the CAD data may act as an interface between an operation program of the additive manufacturing system and the additive manufacturing system to complement the process data and the additive manufacturing. Further, the productivity of the additive manufacturing of the object may be improved by integrating the CAD data into the additive manufacturing process to provide machine-specific instructions of 3D information.

Since the image computational unit may generate the CAD data in real time during the additive manufacturing process, the control unit is capable to predict the current state of the object being manufactured based on the correlation information of the process data, the image data, the error data, the machine data and/or the CAD data. Particularly, the control unit may be adapted to compare the current state of the object at a certain layer level with the correlation of the process data, the image data, the error data, the machine data and/or the CAD data and verify if the object being manufactured meets predefined requirements or has any failure.

In an example, the manufacturing assistance system further comprises an analyzing unit, which is configured to provide analysis data of the object manufactured by the additive manufacturing system to the control unit, wherein the control unit is configured to correlate the process data, the image data, the error data, the machine data, the CAD data and/or the analysis data to determine a current state of the object.

The analyzing unit may comprise an image analysis system such as computed tomography scan system and/or material characterization testing system for determining physical, chemical and/or mechanical properties for a quality control of materials and processes. The analyzing unit may be arranged inside and/or outside the manufacturing chamber and analyze the object during the additive manufacturing process in real time and/or after completion of the manufacturing of the object. Thus, the analyzing unit may evaluate and characterize the object manufactured by the additive manufacturing system and generate corresponding analysis data.

The control unit may collet generated data at various nodes and analyze a relationship among the process data, the image data, the error data, the machine data, the CAD data and/or the analysis data by correlating them with each other. The relationship may be represented graphically and/or in a table. The control unit may be adapted to compare the current state of the object at a certain layer level with the relationship to verify if the object being manufactured meets predefined requirements or has any failure.

In an example, the process sensor unit comprises a plurality of sensor elements configured to generate data regarding a position of a scanner spot, a position of a substrate, a temperature of a cooling water and/or a gas temperature of the additive manufacturing system.

Specifically, process data comprising the position of the scanner spot may comprise position information of the scanner in x-, y- and/or z-direction, which may define the position of the scanner spot in the manufacturing chamber, particularly on the substrate. Accordingly, a current focal position of the laser beam may be determined, which may indicate a size or diameter of the spot. In addition, the process data may further comprise a target and/or actual load power of the laser beam as well as a form of the laser beam and modulations of the laser beam.

Further, process data comprising the position of the substrate may be generated by a distance sensor element configured for detecting a distance between the substrate and the doctor blade. The distance sensor element may be arranged at a bottom side of the doctor blade that faces the substrate. The distance sensor can be, for example, an inductive sensor, an ultrasonic sensor or a radar sensor, which enables contactless distance measurement.

The process sensor unit may also comprise a contact sensor element for detecting a contact between the substrate and the doctor blade. The contact sensor may be arranged at the bottom side of the doctor blade as well, facing the substrate. The contact sensor can be a tactile contact sensor, which may directly contact the substrate.

Further, the process sensor unit may comprise one or more temperature sensor elements configured to measure the temperature of the cooling water and/or the gas temperature at each inlet, each outlet and/or close to the substrate.

In an example, the imaging sensor unit comprises an off-axis camera. The off-axis camera may be arranged to capture the images inside the manufacturing chamber without any obstruction. The off-axis camera may be configured to capture 3-D images.

The imaging sensor unit may comprise an off-axis sensor element, which is configured to monitor a temperature distribution of the powder material spread on the substrate. The off-axis sensor element may comprise charge-coupled device (CCD) or an active-pixel sensor (CMOS) for converting light photons into electrical signals. The camera may comprise a wide field view lens to acquire image data of a broad area of the manufacturing chamber. The off-axis sensor element may, for instance, detect or measure heat intensities of the spread powder on the substrate at different positions as temperature distribution data. Such location-dependent heat intensities may indirectly provide information on a quality and/or a behavior of the gas flow over and along different positions of the spread powder as gas flow data.

In an example, the manufacturing assistance system further comprises a data storage element configured to store the process data, the image data, the error data, the machine data, the CAD data and/or the analysis data collected by the control unit, wherein the control unit is configured to send and/or receive data to and/or from the data storage element.

The data storage element may provide the database, in which the generated process data, image data, error data, machine data, CAD data and/or analysis data are stored. The data storage element may be internal to a computing device, such as a computer's SSD, or a removable device such as an external HDD or universal serial bus (USB) flash drive. There may be also other types of storage media, including magnetic tape, compact discs (CDs) and non-volatile memory (NVM) cards.

The control unit may be configured for a data transfer between the various sensor units and the data storage element. The control unit may be coupled with an interface program, which may be configured to modify the sensor data generated by the sensor units to a standard data format to facilitate the data transfer and/or the data process such as correlating the sensor data with each other to determine a current state of the object.

The mutual communication among the control unit, the sensor units and/or the data storage element may be performed directly via communication cable(s) or via the wireless communication means. The wireless communication means may comprise wireless internee access, Wi-Fi, Bluetooth or the like.

In an example, the data storage element is locally arranged and/or a cloud storage element. The data storage element storing various data such as the process data, the image data, the error data, the machine data, the CAD data and/or the analysis data may comprise huge amounts of data. The data storage element may be arranged locally at the additive manufacturing system. Additionally or alternatively, the data storage unit may be arranged in a cloud system, to which several additive manufacturing systems may be connected directly via communication cable(s) or via the wireless communication means to centrally collect the data, which may allow a reliable data analysis.

In an example, the control unit is configured to compare currently collected process data, image data, error data, machine data, CAD data and/or analysis data with the process data, the image data, the error data, the machine data, the CAD data and/or the analysis data stored in the data storage element to verify the current state of the object manufactured by the additive manufacturing system.

The control unit may be able to analyze the currently collected data based on the data stored in the data storage element and determine if the object being manufactured meets predefined requirements or has any failure. Such verification may be performed for each layer or in the predefined interval during the additive manufacturing process. Accordingly, a real-time monitoring of the object being manufactured may be facilitated.

In an example, the process sensor unit may be configured to detect up to 250000 points per second. At least one, preferably various process sensor elements may be adapted to monitor the additive manufacturing in a predefined frequency or rate. The predefined rate may be up to 250000 points per second per each sensor element to provide reliable real-time process data.

In an example, the control unit is further configured to determine a subsequent step to be performed in the additive manufacturing system, preferably during and/or after completing manufacturing. In an example, the control unit is further configured to execute the determined subsequent step during manufacturing the object.

The control unit may be adapted to the subsequent step based on the correlation of the process data, the image data, the error data, the machine data, the CAD data and/or the analysis data with each other and/or the verification of the current data by comparing it with the data stored in the data storage element. The subsequent step may be continuing, completing or terminating the additive manufacturing. Further, the subsequent step may be also loading a fresh powder material in the manufacturing chamber, setting an initial position of the substrate, inerting the manufacturing chamber, spreading the powder material on the substrate, removing the powder residue and/or welding spatter from the substrate, etc.

Accordingly, the control unit may be able to make an automated decision of the subsequent step to be performed based on the continuously updated process data, image data, error data, machine data, CAD data and/or analysis data. Further, the control unit may be capable to control the additive manufacturing system or at least one component of the system to execute the determined subsequent step.

In an example, the manufacturing assistance system further comprises a human-machine interface configured to show the current state of the object determined by the control unit and receive an input from an operator based thereon. The human-machine interface may be adapted to improve an interplay between the operator and the machine, i.e. additive manufacturing system.

The human-machine-interface may comprise, for instance a graphical user interface means to present machine information, current and/or upcoming steps of the additive manufacturing, the correlation among the data, and/or the current state of the object being manufactured. The human-machine-interface may be also capable to receive an input from the operator. The operator may thus provide the input for an adjustment, a confirmation and/or a next step via the human-machine-interface. Additionally or alternatively, the human-machine-interface may also comprise an audio means to provide information via a speaker and/or receive an input via voice command.

In an example, the manufacturing assistance system further comprises an adjusting unit, wherein the adjusting unit is configured to adjust a process parameter and/or a machine parameter based on the current state of the object. The adjusting unit may be coupled with the control unit. The control unit may be configured to determine if the current state of the object being manufactured deviates from the desired state and/or if any parameter needs to be adjusted during the additive manufacturing process based on the correlation of the data and/or verification of the current state of the object being manufactured. The control unit may be also configured to specify which component of the additive manufacturing system needs to be adjusted at which magnitude.

The adjusting unit may be adapted for receiving information from the control unit and adjust one or more process parameters and/or machine parameters to optimize the additive manufacturing. Since the process data, the image data, the error data, the machine data, the CAD data and/or the analysis data may be collected and correlated in real time, the adjusting unit may immediately adjust the parameters during the additive manufacturing process. For instance, the process parameters and/or the machine parameters may be adjusted for each layer or in a predefined interval. Hence, a severe defect of the manufactured object may be avoided.

In an example, the control unit is configured to adjust a process parameter and/or a machine parameter by applying machine learning. The term "machine learning" may be understood in that the control unit may determine an adjustment of one or more process parameters and/or the machine parameters based on a combination of the data stored in the data storage element with a self-learning algorithm, which may be integrated in the computing element of the control unit.

In particular, the control unit may recognize patterns and/or tendencies of the correlation and/or current state of the object based on the collected process data, image data, error data, machine data, CAD data and/or analysis data in the data storage element and to develop solutions, i.e. subsequent step during the additive manufacturing process. Preferably, the control unit may be capable to determine a necessity of the adjustment of the process parameter and/or a machine parameter and provide the adjusting unit with the information, which component of the additive manufacturing system needs to be adjusted at which time and/or magnitude.

In an example, the control unit may be further configured to apply a process parameter and/or a machine parameter for a subsequent object to be manufactured. The control unit may be adapted to apply improved process parameter(s) and/or machine parameter(s) in the upcoming additive manufacturing of a new object. Accordingly, the productivity and/or the quality of the manufactured object may be improved.

In an example, the control unit is further configured to receive external process data, external image data, external error data, external machine data, external CAD data and/or the external analysis data of another manufacturing assistance system, wherein the control unit is configured to compare the external data with the currently collected data and/or the data stored in the external data storage element.

The data storage element, in other words the database, may be adapted to be networked with several manufacturing assistance systems of several manufacturing systems. Accordingly, the control unit may be able to access the process data, the image data, the error data, the machine data, the CAD data and/or the analysis data generated by different additive manufacturing assistance systems. The huge amount of data may allow the control unit to evaluate and verify the current state of the object being manufactured reliably. Accordingly, the control unit may determine more accurate process parameters and/or machine parameters to be adjusted by applying machine learning. To effectively perform the data management, the control unit may further comprise an interface computing element, which may be configured to standardize a data format of the collected data to facilitate the machine learning.

According to the present invention, an additive manufacturing system is presented. The additive manufacturing system comprises a manufacturing assistance system as described above and at least a manufacturing module. The manufacturing module is configured to additively manufacture an object, and the manufacturing assistance system is integrated in the manufacturing module. The manufacturing module may comprise a manufacturing chamber, in which a powder material spread onto a substrate by a doctor blade may be selectively melted.

The additive manufacturing system may be a selective laser melting (SLM) or a Laser Powder Bed Fusion (LPBF) system.

The additive manufacturing system according to the present invention may be improved by the manufacturing assistance system allowing an online quality control of the additive manufacturing process. Since the process data, the image data, the error data, the machine data, the CAD data and/or the analysis data may be monitored and the current state of the object being manufactured in real time, process parameters and machine parameters may be immediately adjusted, which may improve productivity and/or quality of the manufacturing process and/or the manufactured object.

In an example, the additive manufacturing system may further comprise a powder preparation module and a transfer unit, wherein the powder preparation module is configured to prepare a fresh powder material, wherein the transfer unit is configured to transfer the fresh powder material from the powder preparation module to the manufacturing module. The powder preparation module may comprise at least a fresh powder reservoir configured to store fresh powder. The powder preparation module may be coupled with the transfer unit to arrange the powder preparation module and/or the fresh powder reservoir in position inside the manufacturing chamber of the manufacturing module. The fresh powder material and/or the fresh powder reservoir may be transferred from the powder preparation module to the manufacturing module before start of the additive manufacturing process or during the additive manufacturing process.

In an example, the additive manufacturing system may further comprise a post-processing module configured to separate the object manufactured in the manufacturing module from a substrate, wherein the transfer unit might be further configured to transfer the manufactured object from the manufacturing module to the post-processing module.

The substrate may have a plate-shaped structure acting as a carrier for the manufactured object. After completing the additive manufacturing process, the object can be separated from the substrate. The post-processing module may be further configured to refresh the substrate and/or transport the separated object. The transfer unit may be configured to support the post-processing module to enable a seamless movement of the substrate and/or the completely manufactured object.

In an example, a control unit of the manufacturing assistance system may be configured to control the transfer unit based on a current state of the object in the manufacturing module. The control unit may be further adapted to control the transfer unit based on the current state of the object determined by correlating the process data, the image data, the error data, the machine data, the CAD data and/or the analysis data. The control unit may be further able to control the transfer unit based on the determined subsequent step to be performed in the additive manufacturing system during and/or after completing manufacturing. Accordingly, the control unit may facilitate an automated operation of the additive manufacturing system.

According to the present invention, a method for operating a manufacturing assistance system for an additive manufacturing system is presented. The method comprises generating process data during manufacturing an object by the additive manufacturing system, generating image data of the object during manufacturing, collecting process data generated by a process sensor unit and image data generated by an imaging sensor unit, and determining a current state of the object by correlating the process data and the image data.

The process sensor unit and the imaging sensor unit are arrangeable at the additive manufacturing system.

In an example, the method is adapted for a fully automated additive manufacturing system. The method may be developed as computer-implemented method and a control unit of the manufacturing assistance system may be configured to perform the computer-implemented method for monitoring and controlling the additive manufacturing. Since the control unit may be configured to determine manufacturing steps and adjust process parameters or machine parameters during the additive manufacturing process, a full-automated additive manufacturing may be realized.

According to the present invention, a computer program element for a manufacturing assistance system is presented. The computer program element is adapted to perform the method steps as described above when being executed by a processing element.

It should be noted that the above embodiments may be combined with each other irrespective of the aspect involved. Accordingly, the method may be combined with structural features and, likewise, the system may be combined with features described above with regard to the method.

These and other aspects of the present invention will become apparent from and elucidated with reference to the embodiments described hereinafter.

BRIEF DESCRIPTION OF DRAWINGS

Exemplary embodiments of the invention will be described in the following with reference to the following drawings.

DESCRIPTION OF EMBODIMENTS

Figure 1:
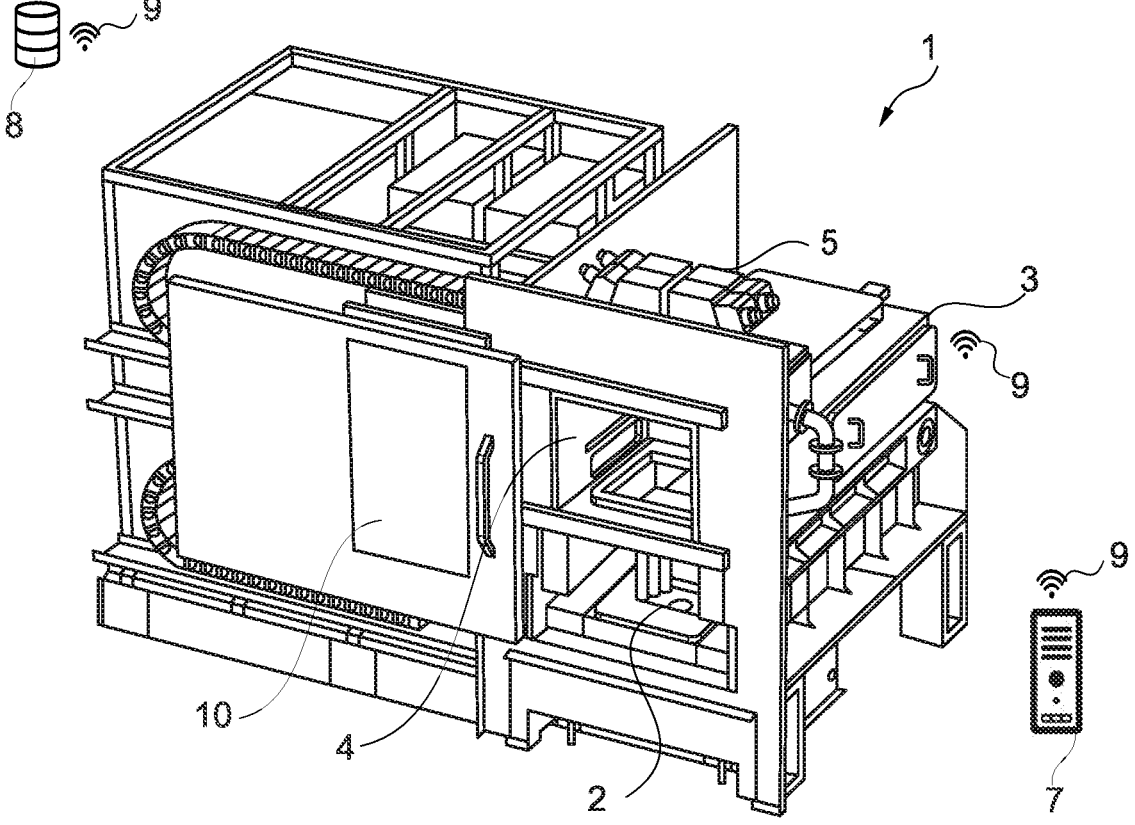
FIG. 1 shows schematically and exemplarily an embodiment of an additive manufacturing system according to the present invention.
Figure 2:
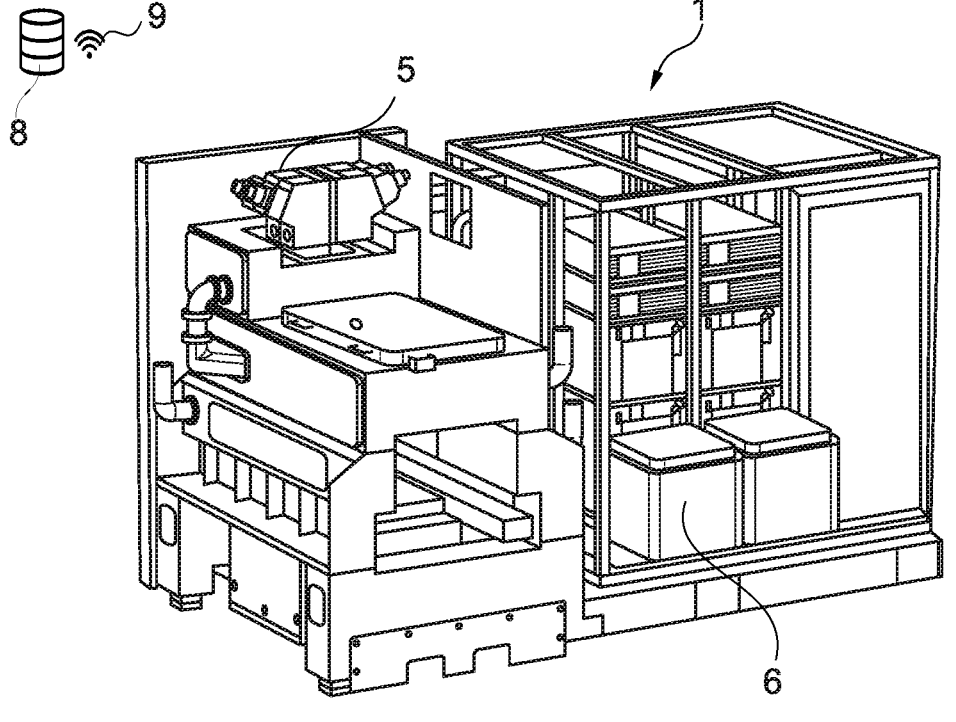
FIG. 2 shows schematically and exemplarily an embodiment of an additive manufacturing system according to the present invention.

FIG. 1 and FIG. 2 show an additive manufacturing system 1, which is arranged to produce an object by additive manufacturing of a powder material applied in layers. The additive manufacturing system 1 may be a selective laser melting (SLM), a Laser Powder Bed Fusion (LPBF) system, or a powder bed fusion with a laser beam for metallic materials (PBF-LB/M).

The additive manufacturing system 1 comprises a manufacturing assistance system 3 and at least a manufacturing module 2. The manufacturing module 2 is configured to additively manufacture the object and the manufacturing assistance system 3 is integrated in the manufacturing module 2. The manufacturing module 2 comprises a manufacturing chamber 4 arranged to perform the selective melting of the powder and an optical unit 5 for providing a laser into the manufacturing chamber 4.

A doctor blade may be arranged inside the manufacturing chamber 4, which applies a fresh powder material from a fresh powder reservoir in layers to a substrate coupled with the manufacturing chamber 4 and removes powder residue and/or welding spatter from the substrate.

The manufacturing chamber 4 may further comprise an opening that is sealed, for example, by an optically transparent material, through which the laser may be provided to selectively melt the powder material applied on the substrate.

The additive manufacturing system 1 further comprises a powder preparation module (not shown) configured to prepare the fresh powder material, a post-processing module (not shown) configured to separate the object manufactured in the manufacturing module 2 from the substrate and a transfer unit (not shown) configured to transfer the fresh powder material from the powder preparation module to the manufacturing module 2 and the manufactured object from the manufacturing module 2 to the post-processing module. The powder preparation module comprises at least a fresh powder reservoir 6 configured to store fresh powder. Thus, the transfer unit may arrange the fresh powder reservoir 6 in position inside the manufacturing chamber 4 of the manufacturing module 2.

The manufacturing assistance system 3 may be configured to enable a fully automated operation of the additive manufacturing system 1. The manufacturing assistance system 3 may be coupled with various sensors and/or computational units to monitor the additive manufacturing process in real time. Further, the manufacturing assistance system 3 comprises a data storage element 8 configured to store data generated by the various sensors and/or computational units and a control unit 7 configured to perform a computer-implemented method for monitoring and controlling the additive manufacturing.

The data storage element 8 can be locally arranged and/or cloud-based. The control unit 7 is configured to send and/or receive data to and/or from the data storage element 8 directly via communication cables or by means of a wireless communication 9.

The manufacturing assistance system 3 comprises a process sensor unit 31 arrangeable at the additive manufacturing system 1 and configured to generate process data during manufacturing the object by the additive manufacturing system 1. The process sensor unit 31 can comprise a plurality of sensor elements configured to generate data regarding a position of a scanner spot, a position of a substrate, a temperature of a cooling water and/or a gas temperature of the additive manufacturing system 1. The process sensor unit 31 is configured to detect up to 250000 points per second.

The manufacturing assistance system 3 further comprises an imaging sensor unit 32 arrangeable at the additive manufacturing system 1 and configured to generate image data of the object during manufacturing. The imaging sensor unit 32 comprises various optical imaging elements to monitor inside the manufacturing chamber 4 by capturing image(s).

The imaging sensor unit 32 comprises at least an on-axis sensor element and an off-axis camera. The on-axis sensor element is arranged to detect process emissions from a melt pool area. If illumination is present, the on-axis sensor can also detect the powder bed surrounding the heat affected zone. The off-axis camera is arranged to a temperature distribution of the powder material spread on the substrate.

The manufacturing assistance system 3 further comprises an error detection unit 34, wherein the error detection unit 34 is configured to generate error data based on a human error during manufacturing the object and send the error data to the control unit 7. The error detection unit 34 may be arranged at the manufacturing module 2, e.g. inside and/or outside the manufacturing chamber 4 and detect if there is a human interference during the additive manufacturing process. The error detection unit 34 may be further adapted to distinguish human errors from machine errors and generate error data of the human errors.

The manufacturing assistance system 3 further comprises a system monitoring unit 33, wherein the system monitoring unit 33 is configured to provide current machine data to the control unit 7. The machine data may comprise, for instance machine routine data, power supply, power consumption, material supply data, material releasing data, operating time, operating information of periphery devices, etc.

The manufacturing assistance system 3 further comprises an image computational unit, wherein the image computational unit is configured to provide CAD data of the object during manufacturing to the control unit 7. The image computational unit may be adapted to be implemented in a build processor, which can provide a machine-specific image data for supporting the additive manufacturing of the object.

The manufacturing assistance system 3 further comprises an analyzing unit, wherein the analyzing unit is configured to provide analysis data of the object manufactured by the additive manufacturing system 1 to the control unit 7. The analyzing unit may comprise an image analysis system such as computed tomography scan system and/or material characterization testing for determining physical, chemical and/or mechanical properties a quality control of materials and processes. Thus, the analyzing unit may evaluate and characterize the object manufactured by the additive manufacturing system 1 and generate corresponding analysis data.

The control unit 7 may collect generated data at various nodes and analyze a relationship among the image data, the error data, the machine data, the CAD data and/or the analysis data by correlating them with each other. The relationship may be represented graphically and/or in a table. The control unit 7 may be adapted to compare the current state of the object at a certain layer level with the correlation to verify if the object being manufactured meets predefined requirements or has any failure.

Particularly, the control unit 7 can be configured to compare currently collected process data, image data, error data, machine data, CAD data and/or analysis data with the process data, the image data, the error data, the machine data, the CAD data and/or the analysis data stored in the data storage element 8 to verify the current state of the object manufactured by the additive manufacturing system 1.

The control unit 7 is further configured to determine a subsequent step to be performed in the additive manufacturing system 1, preferably during and/or after completing manufacturing and execute the determined subsequent step during manufacturing the object. Accordingly, the control unit 7 may be able to make an automated decision of the subsequent step to be performed based on the continuously updated process data, the image data, the error data, the machine data, the CAD data and/or the analysis data. Further, the control unit 7 may be capable to control the additive manufacturing system 1 or at least one component of the system to execute the determined subsequent step.

The control unit 7 is further configured to control the transfer unit of the additive manufacturing system 1 based on a current state of the object in the manufacturing module 2. The control unit 7 may be further able to control the transfer unit based on the determined subsequent step to be performed in the additive manufacturing system 1 during and/or after completing manufacturing.

The manufacturing assistance system 3 further comprises an adjusting unit configured to adjust a process parameter and/or a machine parameter based on the current state of the object. The adjustment of parameters may be performed manually by an operator and/or automatically via the control unit 7 coupled with the adjusting unit.

The control unit 7 is configured to adjust a process parameter and/or a machine parameter by applying machine learning. In particular, the control unit 7 may determine an adjustment of process parameters and/or the machine parameters based on a combination of the data stored in the data storage element 8 with a self-learning algorithm, which may be integrated in the computing element of the control unit 7. Preferably, the control unit 7 may be capable to determine a necessity of the adjustment of the process parameter and/or a machine parameter and provide the adjusting unit with the information, which component of the additive manufacturing system 1 needs to be adjusted at which magnitude. The control unit 7 is further configured to apply the optimized process parameter and/or a machine parameter for a subsequent object to be manufactured.

The control unit 7 is further configured to send and/or receive external data generated by another manufacturing assistance system 3 of different additive manufacturing systems to and/or from the data storage element 8 by means of a wireless communication. The data storage element 8, in other words the database, may be adapted to be networked with several manufacturing assistance systems of several manufacturing systems. Accordingly, the control unit 7 may be able access the process data, the image data, the error data, the machine data, the CAD data and/or the analysis data generated by different additive manufacturing assistance systems.

The huge amount of data may allow the control unit 7 to evaluate and verify the current state of the object being manufactured. Accordingly, the control unit 7 may determine more reliable process parameters and/or machine data by applying machine learning. To effectively perform the data management, the control unit 7 may further comprise an interface computing element, which may be configured to standardized data format of the collected data to facilitate the machine learning.

The manufacturing assistance system 3 further comprises a human-machine interface 10 configured to show the current state of the object determined by the control unit 7 and receive an input from an operator based thereon. The human-machine interface 10 may be adapted to improve an interplay between operator and the additive manufacturing system 1. The human-machine interface 10 may comprise, for instance, a graphical user interface.

By ensuring a real time monitoring and controlling the additive manufacturing system 1 by the manufacturing assistance system 3, productivity and/or quality of the manufactured object may be improved. Further, a fully automated additive manufacturing can be realized.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A manufacturing assistance system for an additive manufacturing system, comprising:

a process sensor unit arranged at the additive manufacturing system, comprising one or more hardware sensors selected from a position sensor configured to measure the position of a spot of a scanner of the additive manufacturing system, a distance sensor configured to measure a position of a substrate inside a manufacturing chamber of the additive manufacturing system, a contact sensor configured to determine a contact between the substrate and a doctor blade of the additive manufacturing system, and a temperature sensor configured to measure the temperature of cooling water and/or gas inside the manufacturing chamber, wherein the process sensor unit is configured to generate process data from measurements of the one or more hardware sensors during manufacturing of the object by the additive manufacturing system, an imaging sensor unit, comprising one or more imaging sensors configured to generate image data of an object during manufacturing inside the manufacturing chamber, wherein the one or more imaging sensors are arranged inside or outside of the manufacturing chamber, an electronic control unit, comprising a computing element, and an error detection unit, wherein the error detection unit is arranged inside or outside the manufacturing chamber, and is configured to (i) generate error data based on a human error or interference, during manufacture of the object, and (ii) send the error data to the electronic control unit, wherein the electronic control unit is configured to (i) collect the process data generated by the process sensor unit, the image data generated by the imaging sensor unit, and the error data generated by the error detection unit, (ii) correlate the process data, the image data, and the error data to determine a current state of the object to verify if the object being manufactured meets predefined requirements or has any failure, and (iii) determine a subsequent step to be performed in the additive manufacturing system and execute the determined subsequent step during manufacturing the object.

2. The manufacturing assistance system according to claim 1, further comprising a system monitoring unit, wherein the system monitoring unit is configured to provide current machine data to the electronic control unit, wherein the electronic control unit is configured to correlate the process data, the image data and/or the current machine data to determine a current state of the object.

3. The manufacturing assistance system according to claim 1, further comprising an image computational unit, wherein the image computational unit is configured to provide CAD data of the object during manufacturing to the electronic control unit, wherein the electronic control unit is configured to correlate the process data, the image data, the error data, machine data and/or the CAD data to determine a current state of the object.

4. The manufacturing assistance system according to claim 1, further comprising an analyzing unit, wherein the analyzing unit is configured to provide analysis data of the object manufactured by the additive manufacturing system to the electronic control unit, wherein the electronic control unit is configured to correlate the process data, the image data, the error data, machine data, CAD data and/or the analysis data to determine a current state of the object.

5. The manufacturing assistance system according to claim 1, wherein the imaging sensor unit comprises an off-axis camera.

6. The manufacturing assistance system according to claim 1, further comprising a data storage element configured to store the process data, the image data, the error data, machine data, CAD data and/or analysis data collected by the electronic control unit, wherein the electronic control unit is configured to send and/or receive data to and/or from the data storage element.

7. The manufacturing assistance system according to claim 6, wherein the data storage element is locally arranged and/or a cloud storage element.

8. The manufacturing assistance system according to claim 1, wherein the electronic control unit is configured to compare currently collected process data, image data, error data, machine data, CAD data and/or analysis data with process data, image data, error data, machine data, CAD data and/or analysis data stored in the data storage element to verify the current state of the object manufactured by the additive manufacturing system.

9. The manufacturing assistance system according to claim 1, wherein the electronic control unit is further configured to determine a subsequent step to be performed in the additive manufacturing system, preferably during and/or after completing manufacturing.

10. The manufacturing assistance system according to claim 9, wherein the electronic control unit is further configured to execute the determined subsequent step during manufacturing the object.

11. The manufacturing assistance system according to claim 1, further comprising a human-machine interface configured to show the current state of the object determined by the electronic control unit and receive an input from an operator based thereon.

12. The manufacturing assistance system according to claim 1, further comprising an adjusting unit, wherein the adjusting unit is configured to adjust a process parameter and/or a machine parameter based on the current state of the object.

13. The manufacturing assistance system according to claim 12, wherein the electronic control unit is configured to adjust the process parameter and/or the machine parameter by applying machine learning.

14. The manufacturing assistance system according to claim 1, wherein the electronic control unit is further configured to receive external process data, external image data, external error data, external machine data, external CAD data and/or external analysis data of another manufacturing assistance system, wherein the control unit is configured to compare the external data with currently collected data and/or data stored in the external data storage element.

15. An additive manufacturing system, comprising:

at least a manufacturing module and the manufacturing assistance system of claim 1, wherein the manufacturing module is configured to additively manufacture an object, and wherein the manufacturing assistance system is integrated in the manufacturing module.

16. A method for operating a manufacturing assistance system for an additive manufacturing system, the method comprising:

generating process data, by a process sensor unit, from measurements of one or more hardware sensors of the process sensor unit during manufacturing an object by the additive manufacturing system, wherein the process sensor unit is arranged at the additive manufacturing system and comprises one or more hardware sensors selected from a position sensor configured to measure the position of a spot of a scanner of the additive manufacturing system, a distance sensor configured to measure a position of a substrate inside a manufacturing chamber of the additive manufacturing system, a contact sensor configured to determine a contact between the substrate and a doctor blade of the additive manufacturing system, and a temperature sensor configured to measure the temperature of cooling water and/or gas inside the manufacturing chamber, generating image data, by an imaging sensor unit, of an object during manufacturing inside the manufacturing chamber by one or more imaging sensors of the imaging sensor unit, wherein the one or more imaging sensors are arranged inside or outside of the manufacturing chamber, generating error data, by an error detection unit, based on a human error or interference and during manufacture of the object, wherein the error detection unit is arranged inside or outside the manufacturing chamber, and sending the generated error data to an electronic control unit comprising a computing element, collecting, by the electronic control unit, the process data generated by the process sensor unit, the image data generated by the imaging sensor unit, and the error data generated by the error detection unit, determining, by the electronic control unit, a current state of the object by correlating the process data, the image data, and the error data to verify if the object being manufactured meets predefined requirements or has any failure, and determining a subsequent step to be performed in the additive manufacturing system and executing the determined subsequent step during manufacturing the object.

17. The method according to claim 16, wherein the method is adapted for an automated additive manufacturing system.

18. A non-transitory computer readable medium storing a computer program for a manufacturing assistance system for an additive manufacturing system, which, when executed by a processing element, is adapted to perform operations comprising:

generating process data, by a process sensor unit, from measurements of one or more hardware sensors of the process sensor unit during manufacturing an object by the additive manufacturing system, wherein the process sensor unit is arranged at the additive manufacturing system and comprises one or more hardware sensors selected from a position sensor configured to measure the position of a spot of a scanner of the additive manufacturing system, a distance sensor configured to measure a position of a substrate inside a manufacturing chamber of the additive manufacturing system, a contact sensor configured to determine a contact between the substrate and a doctor blade of the additive manufacturing system, and a temperature sensor configured to measure the temperature of cooling water and/or gas inside the manufacturing chamber, generating image data, by an imaging sensor unit, of an object during manufacturing inside the manufacturing chamber by one or more imaging sensors of the imaging sensor unit, wherein the one or more imaging sensors are arranged inside or outside of the manufacturing chamber, generating error data, by an error detection unit, based on a human error or interference and during manufacture of the object, wherein the error detection unit is arranged inside or outside the manufacturing chamber, and sending the generated error data to an electronic control unit comprising a computing element, collecting, by the electronic control unit, the process data generated by the process sensor unit, the image data generated by the imaging sensor unit, and the error data generated by the error detection unit, determining, by the electronic control unit, a current state of the object by correlating the process data, the image data, and the error data to verify if the object being manufactured meets predefined requirements or has any failure, and determining a subsequent step to be performed in the additive manufacturing system and executing the determined subsequent step during manufacturing the object.

* * * * *